(12) United States Patent
Havstad et al.

(10) Patent No.: US 6,389,195 B1
(45) Date of Patent: May 14, 2002

(54) DYNAMIC FIBER LOOP-MIRROR FILTER BASED ON PUMP-INDUCED SATURABLE GAIN OR SATURABLE ABSORBER GRATINGS

(75) Inventors: Steven A. Havstad, Lakewood, CA (US); Baruch Fischer, Haifa (IL)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/391,337

(22) Filed: Sep. 8, 1999

(51) Int. Cl.[7] .............................. G02B 6/42; G02B 6/28
(52) U.S. Cl. .............................. 385/27; 385/24; 385/31
(58) Field of Search ............................ 385/27, 24, 31; 356/483; 359/124, 127, 130

(56) References Cited

U.S. PATENT DOCUMENTS

| | | | | |
|---|---|---|---|---|
| 5,144,375 A | * | 9/1992 | Gabriel et al. | 356/345 |
| 5,604,618 A | * | 2/1997 | Mori et al. | 359/127 |
| 5,717,797 A | * | 2/1998 | Evans | 385/27 |

OTHER PUBLICATIONS

D. Sadot and E. Boimovich, "Tunable Optical Filters For Dense WDM Networks," IEEE Communications Magazine, Dec. 1998, pp. 50–55.

S.J. Fisken, "Transient Bragg Reflection Gratings in Erbium–Doped Fiber Amplifiers," Optic Letters, vol. 17, pp. 1776–1778, Dec., 15, 1992.

B. Fisher, J. L. Zyskin, J. W. Sulhoff, and D. J. DiGiovanni, "Nonlinear Four–Wave Mixing in Erbium–Doped Fiber amplifiers," Electronics Letters, vol. 29, pp. 1858–1859, Oct. 14, 1993.

B. Fisher, J. L. Zyskin, J. W. Sulhoff, and D. J. DiGiovanni, "Nonlinear wave mixing and induced gratings in erbium–doped fiber amplifiers," Optics Letters, vol. 18, pp. 2108–2110, Dec. 15, 1993.

M. Horowitz, R. Daisy, B. Fischer, and J. Zyskind, "Narrow–linewidth, singlemode erbium–doped fibre laser with intracavity wave mixing in saturable absorber," Electronics Letters, vol. 30, pp. 648–649, Apr. 14, 1994.

M. Horowitz, R. Daisy, B. Fischer, and J. Zyskind, "Linewidth–narrowing mechanism in lasers by nonlinear wave mixing," Optics Letters, vol. 19, pp. 1406–1408, Sep. 15, 1994.

(List continued on next page.)

*Primary Examiner*—Huy Mai
(74) *Attorney, Agent, or Firm*—Harness, Dickey & Pierce, P.L.C.

(57) ABSTRACT

An all-fiber, optically-tunable, narrowband optical loop-mirror filter (10) that makes use of a loop-mirror (24). The optical filter (10) includes a coupler (12), including two input fiber ports (14, 16) and two output fiber ports (18, 20) that are connected together to form the loop-mirror (24). A saturable medium (22) is positioned in the loop-mirror (24), and can be either a saturable absorber medium or a saturable gain medium. A potentially broadband optical input signal to be filtered and a pump are applied to the input ports (14, 16) of the coupler (12). The counter propagating signals in the loop-mirror (24) generated by the input signal and the pump create two standing wave interference patterns in the saturable medium (22). Depending on whether the input signal and the pump are applied to the same input port (14, 16) or different input ports (14, 16) determines whether the two standing wave interference patterns are in phase with each other or Ξ radians out of phase with each other. If the saturable medium (22) is a saturable gain medium, then the peaks of the pump standing wave interference pattern bleach the gain of the filter (22) at the peak locations, preventing amplification of the input signal at these locations. Likewise, if the saturable medium (22) is a saturable absorber medium, the peaks of the pump interference pattern bleach the absorption of the saturable medium (22) at the peak locations, leaving rest of the saturable medium (22) to provide saturation. Therefore, the filter (10) can be either a bandpass filter or a notch filter.

30 Claims, 5 Drawing Sheets

OTHER PUBLICATIONS

Y. Cheng, J. T. Kringlebotn, W. H. Loh, R. I. Laming, and D. N. Payne, "Stable single–frequency traveling–wave fiber loop laser with integral saturable–absorber–based tracking narrow–band filter," Optics Letters, vo. 20, pp. 875–877, Apr. 15, 1995.

Y. Cheng, J. T. Kringlebotn, W. H. Loh, R. I. Laming, and D. N. Payne, "Stable single–frequency traveling–wave fiber loop laser with integral saturable–absorber–based tracking narrow–band filter," Optics Letters, vol. 20, pp. 875–877, Apr. 15, 1995.

Mark D. Feuer, "Length and Power Dependence of Self–Adjusting Optical Fiber Filters", IEEE Photonics Technology Letters, vol. 10, No. 11, Nov. 1998.

* cited by examiner

DYNAMIC FIBER LOOP-MIRROR FILTER BASED ON PUMP-INDUCED SATURABLE GAIN OR SATURABLE ABSORBER GRATINGS

BACKGROUND OF THE INVENTION

1. Field of the Invention

This invention relates generally to an all-fiber, narrow-band optical filter and, more particularly, to a dynamic all-fiber, loop-mirror optical filter that provides filtering by a pump-induced saturable gain grating or a saturable absorber grating.

2. Discussion of the Related Art

Optical filters are an integral part of most optical systems. All-fiber, optically-tunable filters, including narrowband optical filters are beneficial in many of these optical systems, for example, in optical spectrum analyzers, RF signal processing in analog optical communications links, subcarrier multiplexing and demultiplexing in optical networks, subcarrier removal in digital optical networks where subcarriers are used for signaling, subcarrier signal processing in subcarrier-multiplexed optical fiber communications, ASE-noise removal, and channel routing and monitoring in wavelength-division-multiplexed (WDM) communication networks. All-fiber filters are important to reduce insertion losses in the optical system, and reduce the size and weight of the system.

Fiber Fabry-Perot filters, thin-film dielectric interference filters, conventional fiber Bragg gratings, acousto-optic tunable filters, and arrayed-waveguide grating routers represent the current technology available to provide optical filtering. These techniques and approaches, however, all suffer from one or more drawbacks, including the difficulty to provide bandwidths less than 1 GHz, operation only at fixed wavelengths or over a limited tuning range, requirements for mechanical or temperature tuning, inherent temperature sensitivity, non-fiber design, and finite free spectral range or periodicity. These various optical filtering techniques, as well as other known optical filtering techniques, are discussed and compared in the article by D. Sadot and E. Boimovich, "Tunable Optical Filters For Dense WDM Networks," IEEE Communications Magazine, December 1998, pgs. 50–55.

Investigations have been previously performed in the art using low-concentration erbium-doped fibers as a saturable medium to attempt to develop bandpass optical filters based on both saturable gain and saturable absorber gratings. See for example, S. J. Frisken, "Transient Bragg Reflection Gratings in Erbium-Doped Fiber Amplifiers," Optics Letters, Vol. 17, pp. 1776–1778, Dec. 15, 1992; B. Fischer, J. L. Zyskind, J. W. Sulhoff, and D. J. DiGiovanni, "Nonlinear four-wave mixing in erbium-doped fiber amplifiers," Electronics Letters, Vol. 29, pp. 1858–1859, Oct. 14, 1993; and B. Fischer, J. L. Zyskind, J. W. Sulhoff, and D. J. DiGiovanni, "Nonlinear wave mixing and induced gratings in erbium-doped fiber amplifiers," Optics Letters, Vol. 18, pp. 2108–2110, Dec. 15, 1993. However, the results proposed in these papers are limited, and complicated system configurations prevent their practical application.

The effectiveness of bandpass filters based on pump-induced saturable absorber gratings has been demonstrated for laser linewidth narrowing and a theory to explain its effect has been developed. See, for example, M. Horowitz, R. Daisy, B. Fischer, and J. Zyskind, "Narrow-linewidth, singlemode erbium-doped fiber laser with intracavity wave mixing in saturable absorber," Electronics Letters, vol. 30, pp. 648–649, Apr. 14, 1994; M. Horowitz, R. Daisy, B. Fischer, and J. Zyskind, "Linewidth-narrowing mechanism in lasers by nonlinear wave mixing," Optics Letters, vol. 19, pp. 1406–1408, Sep. 15, 1994; Y. Cheng, J. T. Kringlebotn, W. H. Loh, R. I. Laming, and D. N. Payne, "Stable single-frequency traveling-wave fiber loop laser with integral saturable-absorber-based tracking narrow-band filter," Optics Letters, vol. 20, pp. 875–877, Apr. 15, 1995; and M. Horowitz, R. Daisy, and B. Fischer, "Filtering behavior of a self-induced three-mirror cavity formed by intracavity wave mixing in a saturable absorber," Optics Letters, vol. 21, pp. 299–301, Feb. 15, 1996.

What is needed is an all-fiber, optically-tunable, narrow-band optical filter that does not suffer from the drawbacks mentioned above. It is therefore an object of the present invention to provide such a filter.

SUMMARY OF THE INVENTION

In accordance with the teachings of the present invention, an all-fiber, optically-tunable narrowband optical filter is disclosed that makes use of a loop-mirror. The optical filter includes a coupler having two input fiber ports and two output fiber ports, where the output ports are connected together to form the loop-mirror. An optical saturable medium is positioned in the loop-mirror, which is either a saturable absorber medium or a saturable gain medium. A potentially broadband optical signal light to be filtered and a pump light are applied to the input ports of the coupler. The counter-propagating light waves in the loop generated by both the input signal light and the pump light create a signal standing wave interference pattern and a pump standing wave interference pattern in the saturable medium. Whether the input signal and the pump are applied to the same input port or different input ports determines whether the two standing wave interference patterns are in phase with each other or π radians out of phase with each other, as set by the operation of the loop-mirror.

If the saturable medium is a saturable gain medium, then the peaks, or nodes, of the pump interference pattern bleach the gain of the saturable medium at the peaks, preventing amplification of the input signal at those locations. Likewise, if the saturable medium is a saturable absorber medium, the peaks of the pump interference pattern bleach the absorption of the saturable medium at the peaks, preventing absorption of the input signal at those locations. Therefore, depending on whether the saturable medium is a saturable absorber medium or a saturable gain medium, and whether the input signal interference pattern and the pump interference pattern are in phase or π radians out of phase with each other, the filter is a bandpass filter or a notch filter.

Additional objects, advantages, and features of the present invention will become apparent from the following description and appended claims, taken in conjunction with the accompanying drawings.

DETAILED DESCRIPTION OF THE PREFERRED EMBODIMENTS

The following discussion of the preferred embodiments directed to a fiber loop-mirror filter employing one of either a saturable gain grating or a saturable absorber grating is merely exemplary in nature, and is in no way intended to limit the invention or its applications or uses.

Figure 1:
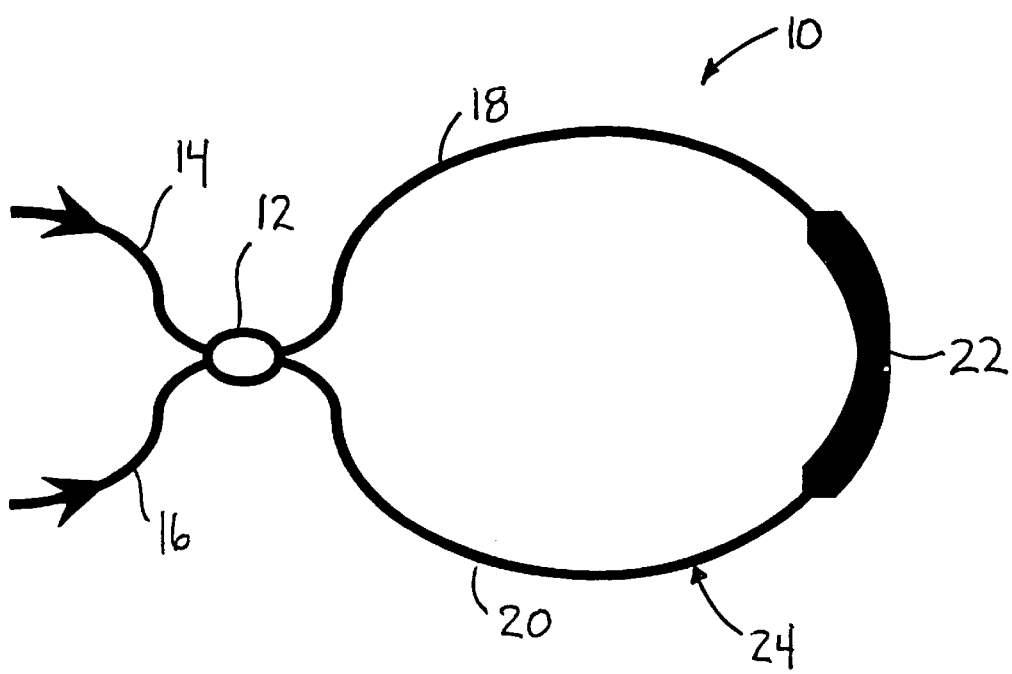
FIG. 1 is a schematic plan view of a dynamic fiber loop-mirror filter employing a pump-induced saturable gain or saturable absorber grating, according to an embodiment of the present invention.

FIG. 1 is a schematic view of a fiber, loop-mirror filter (LMF) 10, according to the invention, that includes a coupler 12, such as a 50/50 or 3 dB coupler. The coupler 12 includes a first fiber optic input cable 14 and a second fiber optic input cable 16, and a first fiber optic output cable 18 and a second fiber optic output cable 20. The output cable 18 is the direct propagation route for light from the input cable 14 through the coupler 12 and the output cable 20 is the coupled route for light from the input cable 14 through the coupler 12. Likewise, the output cable 20 is the direct propagation route for light from the input cable 16 through the coupler 12 and the output cable 18 is the coupled route for light from the input cable 16 through the coupler 12. The first and second output cables 18 and 20 are connected to opposite ends of a saturable medium 22 to define a closed loop 24.

If the saturable medium 22 was removed from the loop 24 and the output cables 18 and 20 were directly connected, the loop 24 would define a loop-mirror, where an optical input signal on one of the input cables 14 and 16 is coupled across the coupler 12, and passes through the loop 24 and back through the coupler 12 to be a reflection of the input signal on the same cable 14 or 16. Particularly, an optical input signal applied to the input cable 14 passes directly through the coupler 12 to the output cable 18, and is also coupled by the coupler 12 into the output cable 20. This optical coupling causes the input signal on the output cable 20 to be phase shifted by $\pi/2$ relative to the input signal propagating on the output cable 18. When the counter propagating signals traveling through the loop 24 return to the coupler 12, the same coupling and phase shifting occurs. The $\pi/2$ phase shifted signal enters the coupler 12 from the output cable 18, passes directly into the input cable 14 with the $\pi/2$ phase shift, and is coupled into the input cable 16 with a $\pi$ phase shift relative to the input signal. Likewise, the signal enters the coupler 12 through the output cable 20, passes directly to the input cable 16 with no phase shift, and is coupled into the input cable 14 with a $\pi/2$ phase shift. Therefore, the two signals entering the input cable 14 constructively interfere with each other when they exit the coupler 12 and travel back through cable 14. The two signals entering the input cable 16 are phase shifted $\pi$ radians apart, and destructively interfere so that essentially no signal is on the input cable 16.

The saturable medium 22 can be either a saturable gain medium or a saturable absorber medium, according to the invention. In one example, the saturable medium 22 is a length of an erbium-doped optical fiber, but can be any saturable optical medium suitable for the purposes described herein. When the saturable medium 22 is operating as a saturable absorber medium, light propagating therethrough is absorbed by the saturable medium 22 when the intensity of the light is below a predetermined threshold intensity that is determined by the doping concentration and physical limitations of the saturable medium 22. When the light exceeds the predetermined intensity, the absorber material of the saturable medium 22 saturates or "bleaches", making it transparent and causing light to pass through unabsorbed. When the saturable medium 22 is operating as a saturable gain medium, a filter activation signal of a certain frequency is applied to the saturable medium 22 to cause the dopant ions to be excited to higher energy states. When an optical signal passes through the saturable medium 22, the photons in the signal interact with the dopant ions, which causes other duplicate photons to be released from the medium by stimulated emission, and causes the ions to return to a lower energy state. As more photons are released, more photons are available to drive the stimulated emission, thus increasing the optical intensity of the signal. The frequency of the activation signal is dependent on the dopants in the saturable medium. The intensity of the optical signal increases to a predetermined maximum gain level supported by the saturable gain medium.

If an input signal is coupled into the loop 24 through one of the input cables 14 or 16, an input signal standing wave interference pattern is created in the loop 24 by the counter-propagating input signal waves. If a second optical signal is coupled into the loop 24 through one of the input cables 14 or 16, referred to herein as a pump, a second set of counter-propagating waves is generated that creates a pump standing wave interference pattern in the loop 24. The standing wave interference patterns are sinusoidal waves that are fixed relative to the loop 24. The pump interference pattern defines an optical grating in the saturable medium 22.

In this discussion, the input signal can be a broadband signal that is to be filtered, and the pump is a narrowband optical signal which creates the saturable gain or saturable absorber grating that does the filtering. If the pump has an amplitude significantly greater than the amplitude of the input signal, its interference pattern will not be disturbed by the interference pattern created by the input signal counter-propagating waves. Although the input signal is possibly broadband and thus creates multiple standing waves in the loop 24 at its various frequencies, the input signal standing wave interference pattern referred to herein is the standing wave interference pattern generated by the frequencies of the input signal that coincide with the frequencies of the pump.

The $\pi/2$ phase shift generated by the coupler 12 and the operation of the loop-mirror as discussed above, creates a known phase relationship between the two standing wave interference patterns that provides filtering. By selecting which of the two input cables 14 or 16 is used to input the pump and the input signal into the loop 24, the interference patterns created by the two sets of counter-propagating waves are either in phase or π radians out of phase with each other. The relative phase between the input signal and the pump at the loop input does not effect this relationship. As will be discussed below, the phase relationship between the input signal standing wave interference pattern and the pump standing wave interference pattern causes optical filtering to occur.

Generally, the optical filtering occurs because the peaks of the pump standing wave interference pattern bleach the absorption of the saturable medium 22 at their respective locations when the saturable medium 22 is a saturable absorber medium, and the peaks of the pump standing wave interference pattern bleach the gain in the saturable medium 22 at their respective locations when the saturable medium 22 is a saturable gain medium. The regions in the saturable medium 22 between the peaks of the pump standing wave interference pattern are still available to provide absorption for the saturable absorber case, and gain for the saturable gain case. By either removing or passing the frequencies of the input signal that coincide with the frequencies of the pump through the optical absorption or gain process discussed above, the LMF 10 can be either a bandpass filter or a notch filter. The gain or absorption of certain frequencies of the input signal standing wave interference pattern in the saturable medium 22 can be provided by adjusting the frequency of the pump to provide tuning of the filtering process. This tuning process does not require mechanical or temperature tuning, as necessary in the prior art filters. Because the length of the induced grating can be very long (meters), the bandwidth of the filtering process can be significantly narrowed.

If the saturable medium 22 is a saturable gain medium and the pump and the input signal enter the loop 24 through the same input cable, for example cable 14, the input signal standing wave interference pattern created by the frequencies of the input signal that are the same as the frequencies of the pump will be in phase with the standing wave interference pattern created by the pump. In this case, the peaks of the standing wave interference pattern of these input signal frequencies experience the regions in the saturable medium 22 where the gain has been used by the pump interference pattern, and therefore these frequencies pass through the loop 24 with less gain. In other words, the peaks of the sinusoidal-shaped pump interference pattern only bleach those regions of the saturable medium 22 where the peaks are formed, leaving the areas between the peaks in the saturable medium 22 available to provide gain.

The frequencies of the input signal that deviate from the frequencies of the pump do not satisfy this phase and periodicity matching condition, and thus these frequencies will be amplified relative to the frequencies of the input signal that do match the pump. Therefore, the frequencies of the input signal that do match the frequencies of the pump are filtered from the input signal, thus creating a notch filter. The loop-mirror operation of the LMF 10 thus provides an amplified mirror copy of the input signal propagating in the opposite direction through the input cable 14, with the frequencies of the input signal that match the frequency of the pump unamplified. Because the filtered output of the input signal and the pump will be output on the cable 14 in this example, and will have the same frequency, some form of modulation of the input signal is required to distinguish it from the pump.

If, however, the pump and the input signal enter the loop 24 through separate input cables 14 and 16, the input signal standing wave interference pattern at the frequencies of the pump will be π radians out of phase with the pump standing wave interference pattern. In this case, the wavelengths of the input signal at the pump frequencies will align with the regions in the saturable medium 22 not effected by the peaks of the pump standing wave interference pattern. The frequencies of the input signal that match the frequencies of the pump are therefore amplified. As the frequencies of the input signal deviate from the pump frequencies, these input signal frequencies will begin to have more overlap with the regions where the pump has removed the gain of the saturable medium 22 and will not amplify as strongly. Thus, a bandpass filter is provided because only the frequencies of the input signal that match the frequencies of the pump are amplified. Therefore, if the input signal is applied to the input cable 14, the loop-mirror operation of the LMF 10 will provide an amplified mirror copy of the input signal only at the frequencies matching the pump.

When the saturable medium 22 is a saturable absorber medium and the pump and the input signal enter the loop 24 through the same input cable 14, where the interference patterns are in phase, the frequencies of the input signal that match the frequencies of the pump are not strongly absorbed by the saturable medium 22 because the pump has bleached the saturable medium 22 at the peaks of the pump interference pattern. As the frequencies of the input signal move away from the frequencies of the pump, these frequencies will be absorbed by the saturable medium 22. Therefore, because the frequencies of the input signal that match the frequencies of the pump are not absorbed, the LMF 10 acts as a bandpass filter.

If the pump and the input signal are applied to the different input cables 14 and 16, the portion of the input signal having frequencies the same as the pump frequencies are absorbed because the peaks of the input signal interference pattern are between the peaks of the pump interference pattern. Other frequencies of the input signal fall in the regions where the peaks of the pump and signal interference patterns are not synchronized and hence are not absorbed as strongly. In this embodiment, the LMF 10 acts as a notch filter.

A more complex filter can be synthesized and tailored by different means. The saturable gain parameters, including the saturation intensity and length, as well as the pump beam intensities, can change the filter parameters. In addition, by using a more complex pump, such as a multi-wavelength source with different and controllable intensities for each wavelength component, a complex and controllable filter could be created.

Figure 2:
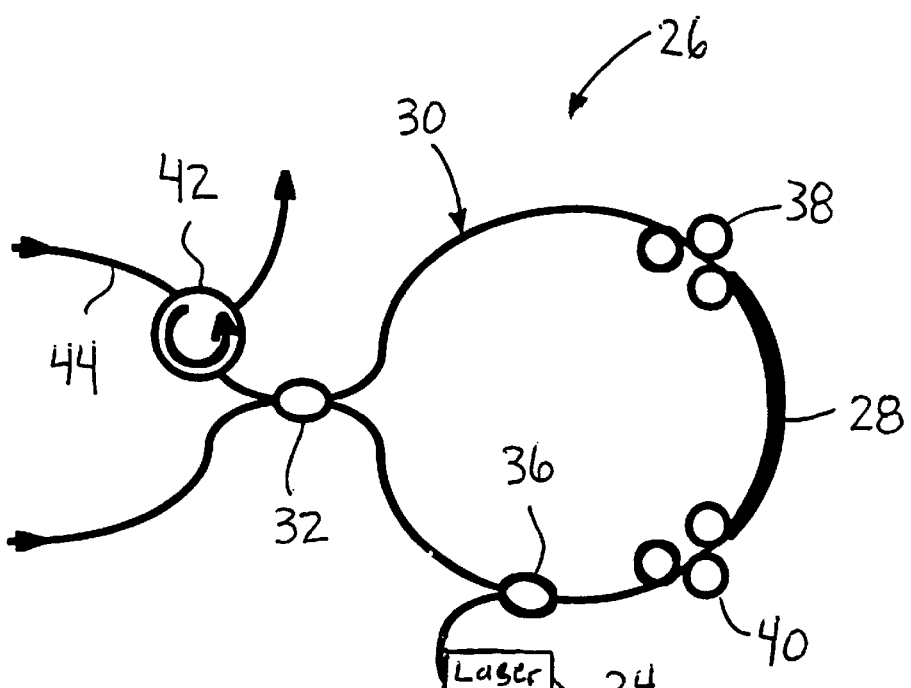
FIG. 2 is a schematic plan view of a dynamic fiber loop-mirror filter employing a pump-induced saturable gain grating, according to another embodiment of the present invention.

FIG. 2 shows an LMF 26 similar to the LMF 10 above, where the saturable medium 22 is a saturable gain medium 28 that is positioned in a loop-mirror 30 connected to a 3 dB coupler 32. The LMF 26 operates in the manner discussed above for the saturable gain case. In this embodiment, a 980 nm or 1480 nm optical activation signal from, for example, a diode laser 34 is applied to a WDM coupler 36 to excite the gain medium 28 to provide the gain. A 980 nm or 1480 nm excitation signal is used in this embodiment because the saturable medium 28 is an erbium-doped fiber. Other saturable gain media may require other excitation wavelengths. Polarization controllers 38 and 40 are positioned in the loop 30 at opposite ends of the saturable medium 28 to allow maximization of the interference between the counter-propagating waves. Because the state-of-polarization of an optical signal propagating down a fiber tends to rotate, the polarization controllers 38 and 40 cause the counter-propagating waves to have the same polarization in the gain medium 28 so that when the waves interfere, the desired standing wave is created. Only one or no polarization controller may be required in certain embodiments. Alternately, polarization maintaining fibers can be used in the loop-mirror 30, and the controllers 38 and 40 can be eliminated. A circulator 42 is positioned in one of the input fiber cables 44, and couples the filtered signal received through the coupler 32 from the LMF 26. Circulators of this type are well known in the art for removing one of counter-propagating signals.

Figure 3:
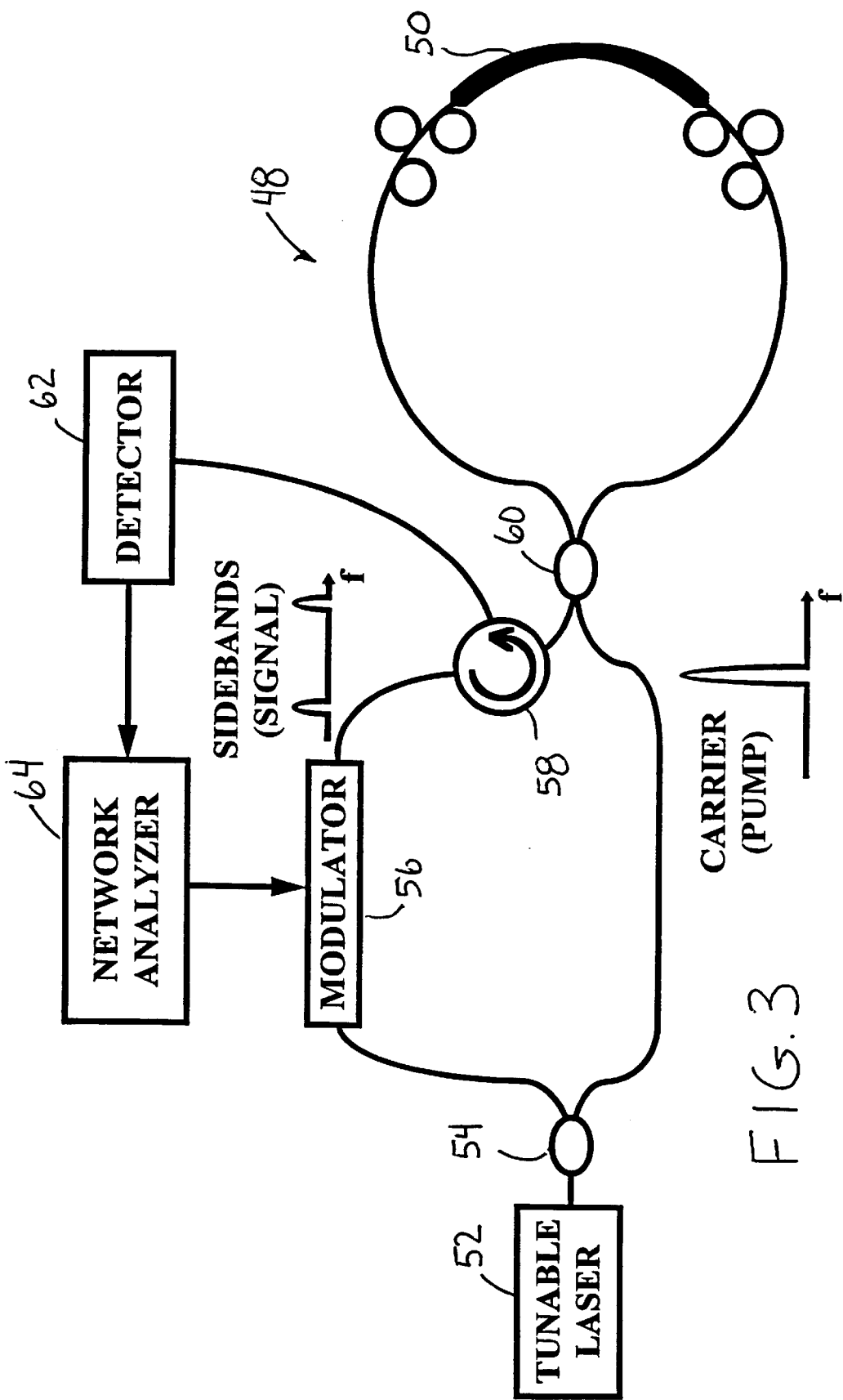
FIG. 3 is an experimental set-up incorporating the dynamic fiber loop-mirror filter shown in FIG. 1, according to the invention.

FIG. 3 shows a plan view of an experimental setup for measurement of the characteristics of an LMF 48, using a saturable absorber medium 50. A tunable laser 52 emits a laser signal to an optical splitter 54 and a first split signal is applied to a modulator 56 that modulates the signal and applies it through a circulator 58 to one input port of a coupler 60. A second split signal from the split 54 is applied to another input port of the coupler 60. Because the input signals to the LMF 48 are applied to separate input ports, the two standing wave interference patterns will be n radians out of phase with each other, and the filter will be a notch filter. The length of the medium 50 is selected based on the desired bandwidth. The filtered output signal from the circulator 58 is applied to a detector 62 to detect the output signal, and a signal from the detector 62 is applied to a network analyzer 64. The network analyzer 64 is used to make swept-frequency measurements and provides the RF drive signal to the modulator 56 to modulate the first split signal. The modulator 56 is driven at a relatively high power and the modulator bias is adjusted so all the power in the optical carrier is shifted into the sidebands. As the RF frequency input to the modulator 56 is swept, the sidebands probe the filter response. The magnitude of the sideband signals was adjusted to about 40 dB below the pump power.

Figure 4:
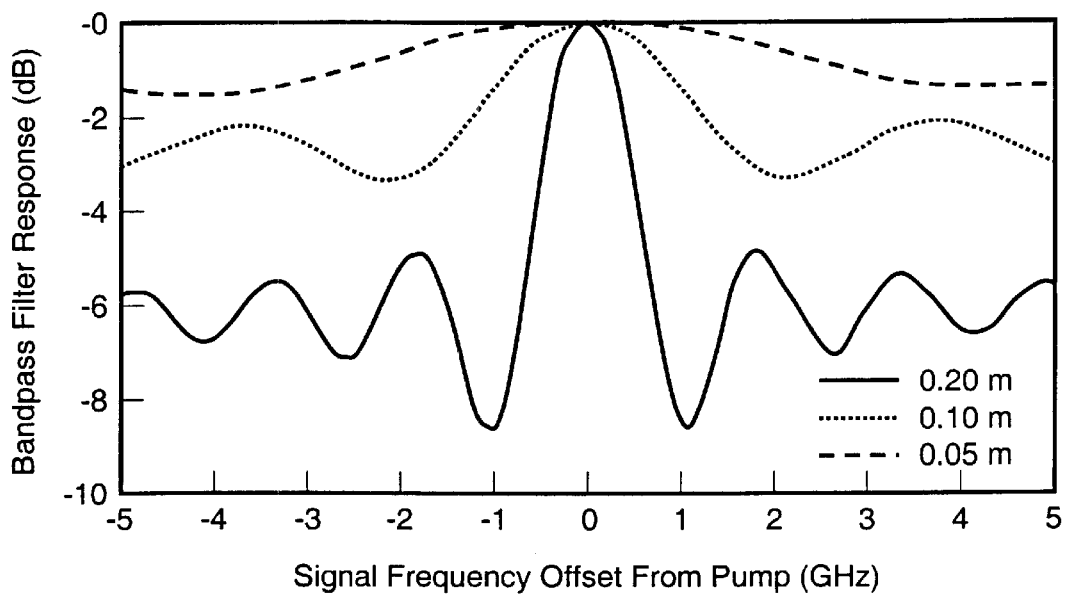
FIG. 4 is a graph with response in dB on the vertical axis and signal frequency offset from the pump frequency in GHz on the horizontal axis, showing the theoretical response of a bandpass loop-mirror filter employing a saturable absorber grating for three different erbium-doped fiber lengths, according to the invention.

FIG. 4 is a graph with filter response in dB on the vertical axis and signal frequency offset from pump frequency in GHz on the horizontal axis, showing the theoretical response of an LMF of the invention that employs a saturable absorber grating for three different erbium-doped fiber lengths. In this example, the input signal and the pump are applied to the same input port of the LMF so that the LMF acts as a bandpass filter. As is apparent, as the frequency of the input signal moves away from the frequency of the pump, the input signal is not amplified as strongly.

Figure 5:
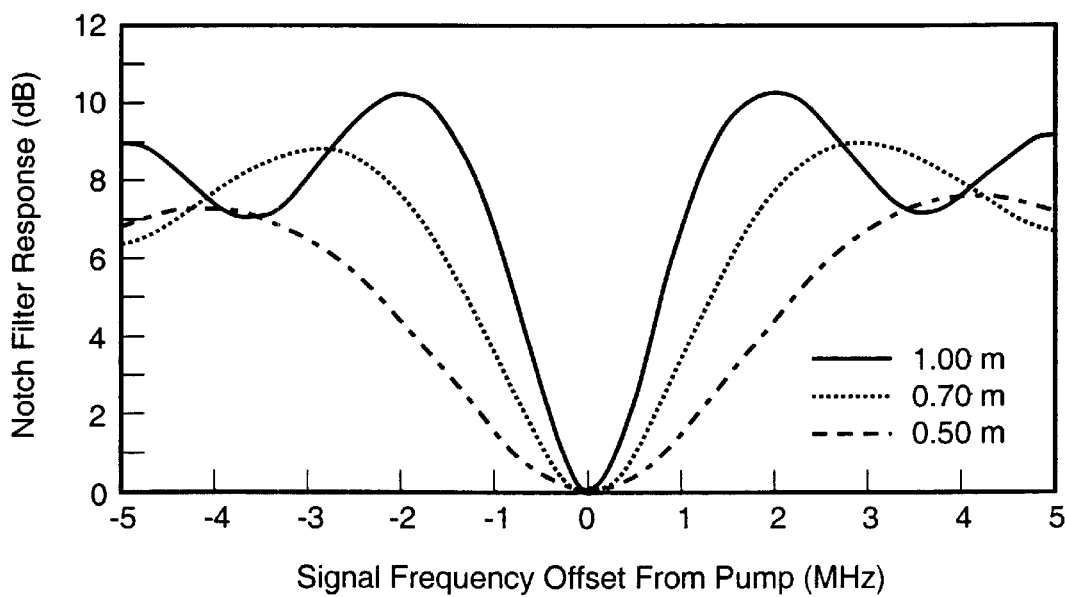
FIG. 5 is a graph response in dB on the vertical axis and signal frequency offset from the pump frequency in MHz on the horizontal axis, showing the theoretical response of a notch loop-mirror filter employing a saturable gain grating for three different erbium-doped lengths, according to the invention.

FIG. 5 is a graph with response in dB on the vertical axis and signal frequency offset from the pump frequency in MHz on the horizontal axis, showing the theoretical response for an LMF of the invention that employs a saturable gain grating for three different erbium-doped fiber lengths. In this example, the input signal and the pump are applied to the same input port of the LMF so that the LMF acts as a notch filter. As is apparent, as the frequency of the input signal moves away from the frequency of the pump, the input signal is increasingly amplified.

Figure 6:
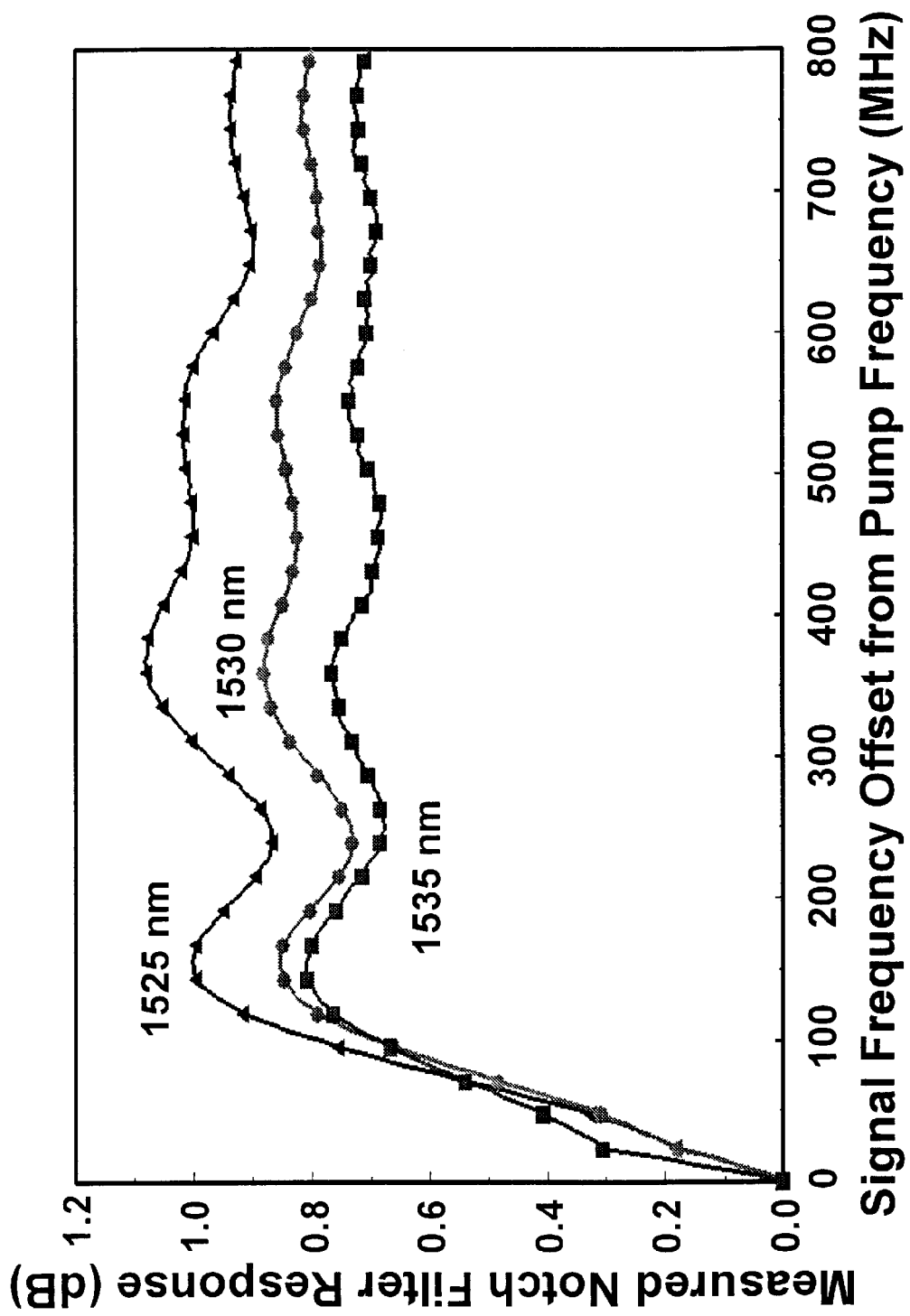
FIG. 6 is a graph with response in dB on the vertical axis and signal frequency offset from the pump frequency in MHz on the horizontal axis, showing the measured response of a tunable notch loop-mirror filter employing a saturable gain grating for three different pump wavelengths, according to the invention.

FIG. 6 is a graph with filter response in dB on the vertical axis and signal frequency offset from pump frequency in MHz on the horizontal axis that shows a measured response of a tunable LMF of the invention that employs a saturable gain grating filter for three different pump wavelengths. In this example, the input signal and the pump are applied to the same input port so that the LMF acts as a notch filter. As is apparent, as the frequency of the input signal moves away from the frequency of the pump for the three different pump wavelengths, the input signal is increasingly amplified.

Figure 7:
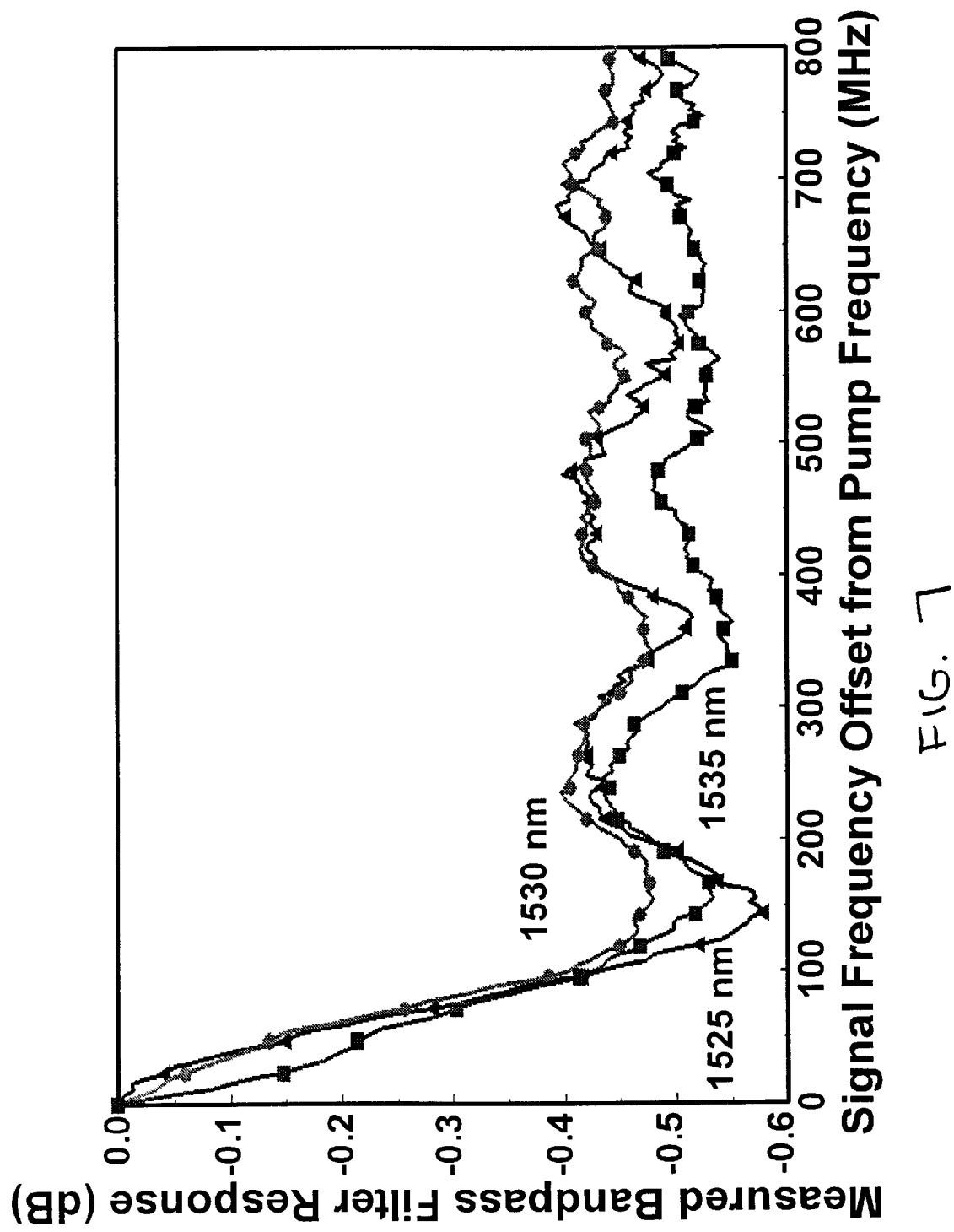
FIG. 7 is a graph with response in dB on the vertical axis and signal frequency offset from the pump frequency in MHz on the horizontal axis, showing the measured response of a tunable bandpass loop-mirror filter employing a saturable absorber grating for three different pump wavelengths, according to the invention.

FIG. 7 is a graph with filter response in dB on the vertical axis and signal frequency offset from pump frequency in MHz on the horizontal axis that shows a measured response for an LMF of the invention that employs a saturable absorber grating for three different pump wavelengths. In this example, the input signal and the pump are applied to the same input port so that the LMF acts as a bandpass filter. As is apparent, as the frequency of the input signal moves away from the pump frequency, the filtering input signal is increasingly attenuated.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A loop-mirror filter for filtering an optical input signal, said filter comprising:
    a coupler responsive to the optical input signal and an optical pump;
    a loop-mirror including a first end and a second end connected to the coupler, said coupler coupling the pump and the input signal into the loop-mirror and creating a pump interference pattern from the pump travelling through the loop-mirror and a signal interference pattern from the input signal travelling through the loop-mirror; and
    a saturable medium positioned in the loop-mirror, said pump pattern creating a pump standing wave interference pattern in the saturable medium and said input signal interference pattern creating an input signal standing wave interference pattern in the saturable medium, said input signal standing wave interference pattern interacting with the pump standing wave interference pattern in the saturable medium to filter the optical input signal.

2. The filter according to claim 1 wherein the saturable medium is a saturable absorber medium.

3. The filter according to claim 2 wherein the coupler includes a first input port and a second input port, said input signal being applied to the first input port and said pump being applied to the second input port, said pump standing wave and input signal standing wave interference patterns being π radians out of phase with each other and interacting to cause notch filtering of the input signal.

4. The filter according to claim 2 wherein the input signal and the pump are applied to a common input port of the coupler, said pump standing wave and input signal standing wave interference patterns being in phase with each other and interacting to cause bandpass filtering of the input signal.

5. The filter according to claim 1 wherein the saturable medium is a saturable gain medium.

6. The filter according to claim 5 wherein the coupler includes a first input port and a second input port, said input signal being applied to the first input port and said pump being applied to the second input port, said pump standing wave and input signal standing wave interference patterns being π radians out of phase with each other and interacting to cause bandpass filtering of the input signal.

7. The filter according to claim 5 wherein the input signal and the pump are applied to a common input port of the coupler, said pump standing wave and input signal standing wave interference patterns being in phase with each other and interacting to cause notch filtering of the input signal.

8. The filter according to claim 5 further comprising an excitation source positioned in the loop-mirror, said excitation source coupling an optical excitation signal into the loop-mirror, said excitation signal exciting the saturable medium to cause the saturable medium to be the saturable gain medium.

9. The filter according to claim 1 wherein the input signal standing wave interference pattern is defined by frequencies of the input signal that match the frequencies of the pump.

10. The filter according to claim 1 further comprising an optical source that generates the pump, said optical source being a tunable optical source for changing the frequencies of the pump to change the filtering of the input signal.

11. The filter according to claim 1 wherein the saturable medium is a doped optical fiber.

12. The filter according to claim 1 further comprising at least one polarization controller positioned in the loop-mirror for providing polarization control of the input signal and/or the pump.

13. The filter according to claim 1 further comprising a circulator, said coupler including an input port that receives the input signal, said circulator being positioned in the input port and directing a filtered input signal from the input port.

14. A loop-mirror filter for filtering an optical signal, said filter comprising a fiber loop-mirror, said fiber loop-mirror including a coupler having at least one input port connected to one side of the coupler and a fiber loop connected to an opposite side of the coupler, said filter further comprising an optical saturable medium positioned in the fiber loop, said saturable medium selected from the group consisting of saturable absorber mediums and saturable gain mediums.

15. The filter according to claim 14 wherein the filter is either a bandpass filter or a notch filter.

16. The filter according to claim 14 wherein the saturable medium is a doped optical fiber.

17. The filter according to claim 14 further comprising an optical source, said optical source generating a pump and said at least one input port being responsive to the pump, said optical source being a tunable optical source that changes a center wavelength of the filter.

18. The filter according to claim 14 wherein the coupler is a 50/50 coupler.

19. An optical filtering device for filtering an optical signal, said device comprising:
an optical waveguide;
a first optical standing wave interference pattern formed within the optical waveguide; and
a second optical standing wave interference pattern formed within the optical waveguide relative to the first standing wave interference pattern, said first and second standing wave interference patterns being formed of substantially the same optical wavelengths where the first standing wave interference pattern is generated by frequencies in the optical signal, and wherein the intensity of the second interference pattern is greater than the intensity of the first interference pattern, said second standing wave interference pattern interacting with said first standing wave interference pattern to filter the optical signal.

20. The device according to claim 19 wherein the first standing wave interference pattern and the second standing interference pattern are $\pi$ radians apart in phase.

21. The device according to claim 19 wherein the first standing wave interference pattern and the second stand wave interference pattern are substantially in phase with each other.

22. A method of filtering an optical signal, said method comprising the steps of:
applying an optical input signal to a coupler;
applying an optical pump to the coupler;
generating a first set of counter-propagating waves from the input signal in a fiber loop connected to the coupler;
generating a second set of counter-propagating waves from the pump in the fiber loop;
generating an input signal standing wave interference pattern in a saturable medium positioned within the fiber loop from the first set of counter-propagating waves;
generating a pump standing wave interference pattern in the saturable medium from the second set of counter-propagating waves; and
filtering the input signal from the interaction of the input signal standing wave interference pattern and the pump standing wave interference pattern in the saturable medium, said input signal interference pattern and said pump interference pattern being formed of substantially the same optical frequencies.

23. The method according to claim 22 wherein the steps of generating the input signal interference pattern and the pump interference pattern includes generating the interference patterns in a saturable gain medium that amplifies optical signals.

24. The method according to claim 23 wherein the steps of applying the input signal and the pump to the coupler includes applying the input signal and the pump to different input ports of the coupler so that the steps of generating the input signal interference pattern and the pump interference pattern generate the interference patterns $\pi$ radians out of phase with each other, said step of filtering including notch filtering of the input signal.

25. The method according to claim 23 wherein the steps of applying the input signal and the pump to the coupler includes applying the input signal and the pump to the same input port of the coupler so that the steps of generating the input signal interference pattern and the pump interference pattern generate the interference pattern in phase with each other, said step of filtering including bandpass filtering of the input signal.

26. The method according to claim 22 wherein the steps of generating the input signal interference pattern and the pump interference pattern includes generating the interference patterns in a saturable absorber medium that attenuates optical signals.

27. The method according to claim 26 wherein the steps of applying the input signal and the pump to the coupler includes applying the input signal and the pump to different input ports of the coupler so that the steps of generating the input signal interference pattern and the pump interference pattern generate the interference patterns $\pi$ radians out of phase with each other, said step of filtering including bandpass filtering of the input signal.

28. The method according to claim 26 wherein the steps of applying the input signal and the pump to the coupler includes applying the input signal and the pump to the same input port of the coupler so that the steps of generating the input signal interference pattern and the pump interference pattern generate the interface pattern in phase with each other, said step of filtering including notch filtering of the input signal.

29. The method according to claim 22 further comprising the step of changing the frequency of the pump to provide tunable filtering of the input signal.

30. The method according to claim 22 further comprising the step of providing polarization control of the input signal and the pump.

* * * * *